United States Patent [19]

van den Berg

[11] 4,290,164

[45] Sep. 22, 1981

[54] ADAPTOR FOR CONNECTING A WIPER BLADE TO A WIPER ARM

[75] Inventor: Johan H. van den Berg, Hasselt, Belgium

[73] Assignee: Archambel, S.A., Brussels, Belgium

[21] Appl. No.: 83,511

[22] Filed: Oct. 10, 1979

[30] Foreign Application Priority Data

Nov. 15, 1978 [FR] France ............................... 78 32252

[51] Int. Cl.³ .............................................. B60S 1/40
[52] U.S. Cl. .................................................. 15/250.32
[58] Field of Search ...................... 15/250.32–250.35, 15/250.42

[56] References Cited

FOREIGN PATENT DOCUMENTS

| | | |
|---|---|---|
| 2310374 | 5/1975 | Fed. Rep. of Germany . |
| 2631402 | 1/1978 | Fed. Rep. of Germany ... 15/250.32 |
| 2801246 | 7/1978 | Fed. Rep. of Germany ... 15/250.32 |
| 2078254 | 11/1971 | France . |
| 2192512 | 2/1974 | France . |
| 2205022 | 5/1974 | France . |
| 2366151 | 6/1978 | France ................. 15/250.32 |
| 2377301 | 8/1978 | France . |
| 1232157 | 5/1971 | United Kingdom . |

Primary Examiner—Peter Feldman

Attorney, Agent, or Firm—Wegner, Stellman, McCord, Wood & Dalton

[57] ABSTRACT

An adaptor (60,160,260,360) is provided for connecting two different style arm ends (41,42) to a crosspin-type blade (43). The adaptor includes three latch or blocking means (63,163,263,363; 70,170,270, 372; 72,172,272,372) with the first latch or blocking means (63,163,263,363) having a constricted opening (64,164,264,364) facing forward or rearward of the adaptor (60,160,260,360) for snap-fitting over a crosspin (44) of the blade (43). The second latch or blocking means (70,170,270,372) includes a flexible member (66,166,266,373) located on a body (61,161,261,361) of the adaptor (60,160,260,360) to engage in an opening (48) in the hook end of a first style arm (41) when said hook end encircles the body (61,161,261,361) of the adaptor. The third latch or blocking means (72,172,272,372) includes a pair of flexible members (73,173,273,373) located on the body (61,161,261,361) to engage behind a shoulder (58) of a second curvature (55) on the hook end of the second style arm (42) when the hook end encircles the body (61,161,261,361). In one embodiment, the second and third latch or blocking means (93) are combined into one which fits through the opening (48) or slot (53) in the arm ends (41,42) and snaps into an opening (95) in the body (361) of the adaptor (360).

17 Claims, 32 Drawing Figures

ADAPTOR FOR CONNECTING A WIPER BLADE TO A WIPER ARM

DESCRIPTION

1. Technical Field

This invention relates to a connection between a windshield wiper arm and a windshield wiper blade and, more particularly, to an adaptor for connecting different style windshield wiper arm ends to a cross-pin-type wiper blade.

2. Background Art

The adaptor according to the invention is an intermediate loose part between the wiper blade on the one side and the corresponding wiper arm end on the other side. These adaptors, therefore, necessarily comprise two essential parts: a first part which must be designed in such a way that it is easily fitted to and removed from the holder or superstructure of the wiper blade and a second part which must be designed in such a way that it is easily fitted to and removed from the free end portion of the wiper arm.

The replacement of the worn or damaged wiper blades on motor vehicles, and consequently on wiper arm ends of a given type, is the origin of some serious problems, not only for the manufacturers of wiper blades destined for the replacement market, but also for the dealers who sell and the consumers who buy the wiper blades. Indeed, besides the numerous types of wiper blades, there are on the market a large number of types of wiper arms which have been designed with a special blade connecting fitting of their own. This means that a wiper blade designed for one type of wiper arm end cannot be used on another type of arm end, unless special loose adaptors are provided with the wiper blade. In order to satisfy the needs of his customer, the dealer is, therefore, obliged to stock not only a large number of wiper blades, but also a very large number of adaptors. Moreover, the consumer is often not able to choose from a chart or from a book which wiper blade and adaptor he needs, because the type of the wiper arm end may change within a model year and from model year-to-model year even on the same make of vehicle. The vehicle manufacturers do not publish lists identifying which arm ends are on which vehicle. Therefore, the consumer must have a mechanical aptitude to be able to identify the type of adaptor for use with the particular arm end, which adaptor must also fit the blade selected.

As long as different types of arm ends are produced, the above-mentioned problems cannot be avoided completely, however, any simplification, i.e. for example any reduction of the number of adaptors needed, is to be considered as being an improvement on the present situation.

DISCLOSURE OF INVENTION

The present invention is directed to overcoming one or more of the problems as set forth above.

The present invention is directed to an adaptor which makes it possible to fit a wiper blade of a particular type to two different types of wiper arm ends. The adaptor can be inexpensively molded of plastic and can be easily attached to and easily removed from both the wiper arm end and the wiper blade.

The adaptor according to the invention makes it possible to fit a wiper blade of a certain type to two different wiper arm ends of the type called "hook-slot". The adaptor is provided with three latch or blocking means with a first latch or blocking means securing the adaptor onto the pivot pin or rivet of the wiper blade, a second latch or blocking means securing the adaptor onto a first type of hook-slot arm end and a third latch or blocking means for securing the adaptor onto a second type of hook-slot arm end. These three latch or blocking means on the adaptor are designed in such a way that they permit easy fitting onto and removal from the wiper blade, as well as from the two types of wiper arm ends.

The first latch or blocking means, which serve to fit the adaptor onto the rivet of the wiper blade, may consist of already known devices capable of snap-fitting the rivet of the wiper blade into a corresponding seat provided at the frontal end portion of the adaptor housing.

The second latch or blocking means, which serve to fit the adaptor to a first type of wiper arm end, comprises a stop which is part of a flexible member or blade attached to the rear end portion of the adaptor housing. This stop enters into an opening provided in the curved part of the hook of the wiper arm end, and, in co-operation with the general form of the adaptor which is lying inside of the hook of the wiper arm end, prevents any displacement of said arm with respect to the adaptor.

The third latch or blocking means, which serve to fit the adaptor to a second type of wiper arm end, comprise two stops which are part of two flexible members or blades incorporated in the lateral flanks of the device. The curved end portion of this type of wiper arm is provided with a second curvature which directs this extremity downwards, i.e. away from the straight portion of the wiper arm. Said two stops place themselves inside of the second curvature, and, in co-operation with the general form of the adaptor which is lying inside of the hook of the wiper arm end, prevent any displacement of said arm with respect to the adaptor.

BEST MODE FOR CARRYING OUT THE INVENTION

FIGS. 1 to 4 show the different elements to be connected by means of the adaptor according to the invention. In other words, the wiper arm ends 41,42 must be fitted onto a wiper blade 43 to permit a pivotal movement of said arm ends 41,42 round a rivet 44 on the wiper blade 43 and to permit an easy fitting and an easy removal of the wiper blade 43 from the wiper arm ends 41,42.

Figure 1:
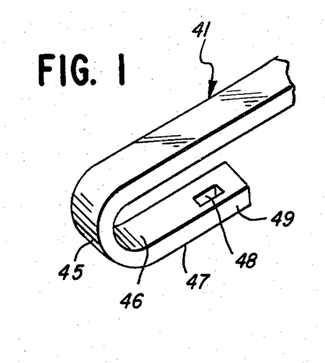
FIG. 1 is a perspective view of a first type of wiper arm end which may be mounted on an adaptor incorporating the invention.
Figure 2:
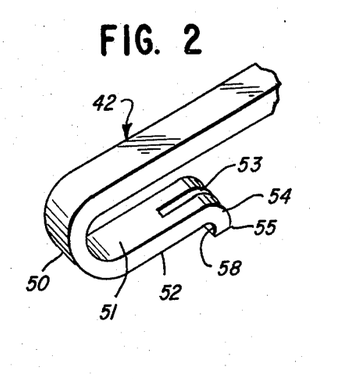
FIG. 2 is a perspective view of a second type of wiper arm end which may be mounted on an adaptor incorporating the invention.
Figure 3:
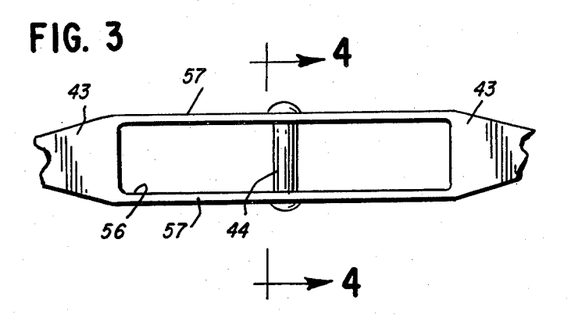
FIG. 3 is a top plan view of the connector portion of a wiper blade.
Figure 4:
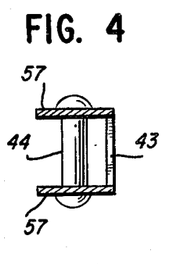
FIG. 4 is a cross-sectional view along line 4—4 of FIG. 3.
Figure 5:
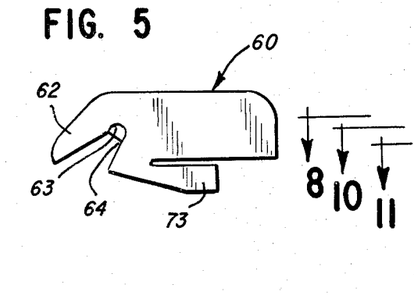
FIG. 5 is an elevational view of a first embodiment of the adaptor incorporating the invention.
Figure 6:
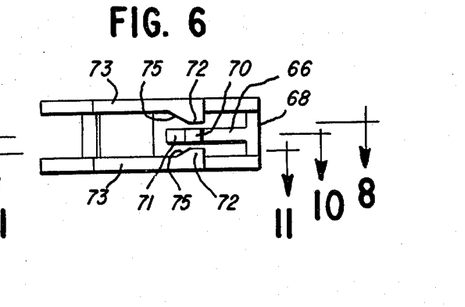
FIG. 6 is a bottom view of FIG. 5.
Figure 7:
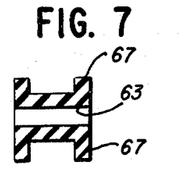
FIG. 7 is a cross-sectional view along line 7—7 of FIG. 8.
Figure 8:
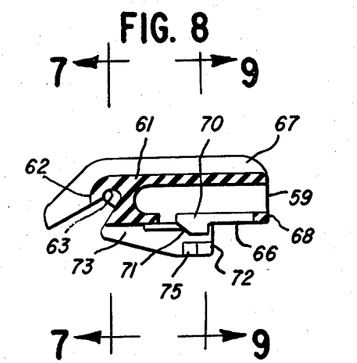
FIG. 8 is a cross-sectional view along line 8—8 of FIG. 6.
Figure 9:
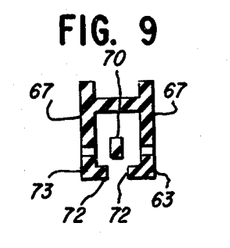
FIG. 9 is a cross-sectional view along line 9—9 of FIG. 8.

The wiper arm end 41, shown in FIG. 1, comprises a hook 45 with an internal surface 46, an external surface 47 and a rectangular opening 48 in the free end portion 49 of the hook 45. The wiper arm end 42, shown in FIG. 2, comprises a hook 50 with an internal surface 51, an external surface 52 and a longitudinal slot 53 in the free end portion 54 of the hook 50. The free end portion 54 of the hook 50 is provided with a second curvature 55 which directs part of the end portion 54 downwards, i.e. away from the straight portion of said wiper arm end 42, to form a shoulder 58 on the hook 50. As for the wiper blade 43, it is provided with a crosspin, a pivot pin or rivet 44 which is accessible through a substantially rectangular opening 56 defined by spaced apart side walls 57.

Figure 10:
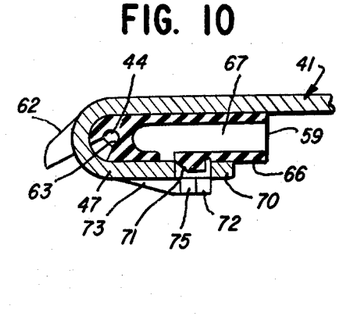
FIG. 10 is a cross-sectional view along line 10—10 of FIG. 6 with the first type of wiper arm end, such as is shown in FIG. 1, mounted on the improved adaptor.
Figure 11:
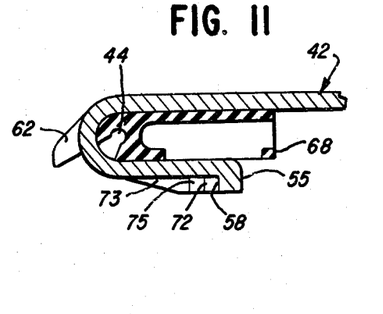
FIG. 11 is a cross-sectional view along line 11—11 of FIG. 6 with the second type of wiper arm end, such is shown in FIG. 2, mounted on the improved adaptor.
Figure 12:
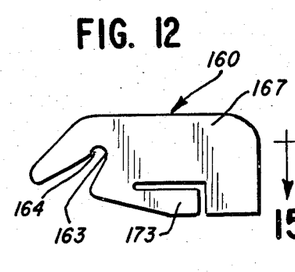
FIG. 12 is an elevational view of a second embodiment of the adaptor incorporating the invention.
Figure 13:
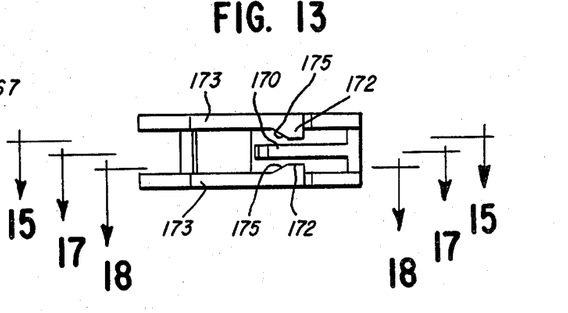
FIG. 13 is a bottom view of FIG. 12.
Figure 14:
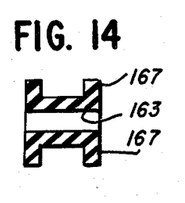
FIG. 14 is a cross-sectional view along line 14—14 of FIG. 15.
Figure 15:
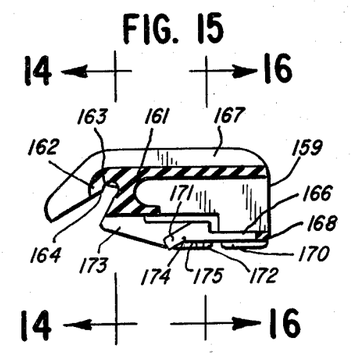
FIG. 15 is a cross-sectional view along line 15—15 of FIG. 13.
Figure 16:
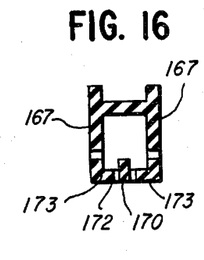
FIG. 16 is a cross-sectional view along line 16—16 of FIG. 15.
Figure 17:
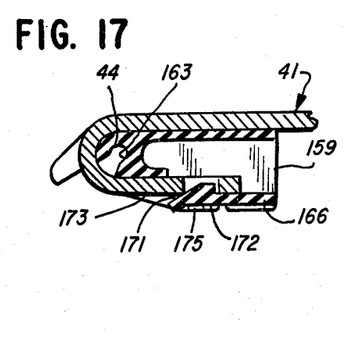
FIG. 17 is a cross-sectional view along line 17—17 of FIG. 13 with the first type of wiper arm end, such as shown in FIG. 1, mounted on the improved adaptor.
Figure 18:
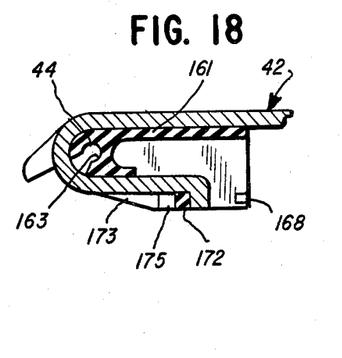
FIG. 18 is a cross-sectional view along line 18—18 of FIG. 13 with the second type of wiper arm end, such as shown in FIG. 2, mounted on the improved adaptor.
Figure 19:
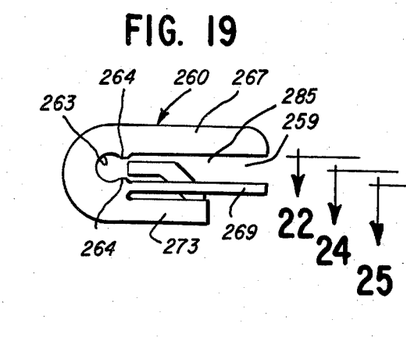
FIG. 19 is an elevational view of a third embodiment of the adaptor incorporating the invention.
Figure 20:
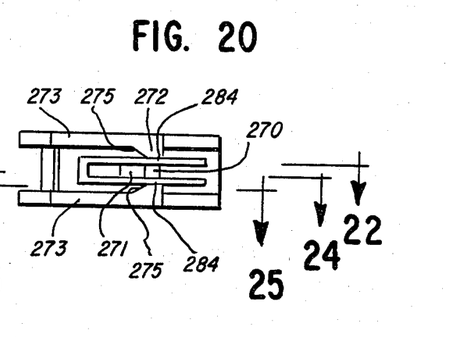
FIG. 20 is a bottom view of FIG. 19.
Figure 21:
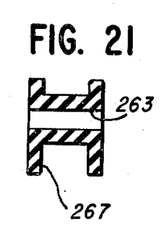
FIG. 21 is a cross-sectional view along line 21—21 of FIG. 22.
Figure 22:
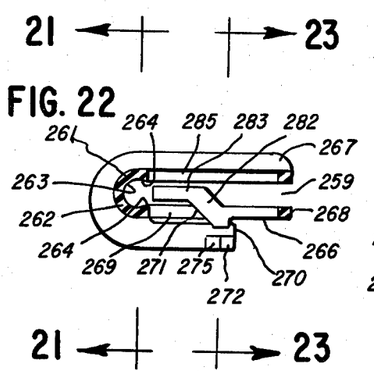
FIG. 22 is a cross-sectional view along line 22—22 of FIG. 20.
Figure 23:
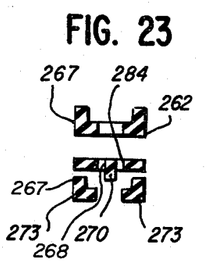
FIG. 23 is a cross-sectional view along line 23—23 of FIG. 22.
Figure 24:
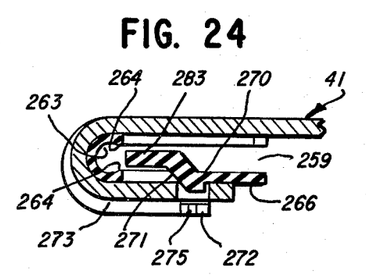
FIG. 24 is a cross-sectional view along line 24—24 of FIG. 20 with the first type of wiper arm end, such as shown in FIG. 1, mounted on the improved adaptor.
Figure 25:
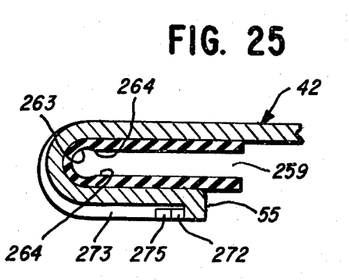
FIG. 25 is a cross-sectional view along line 25—25 of FIG. 20 with the second type of wiper arm end, such as shown in FIG. 2, mounted on the improved adaptor.
Figure 26:
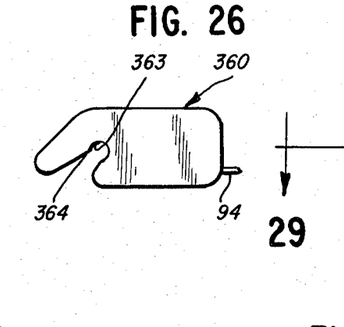
FIG. 26 is an elevational view of a fourth embodiment of the adaptor incorporating the invention.
Figure 27:
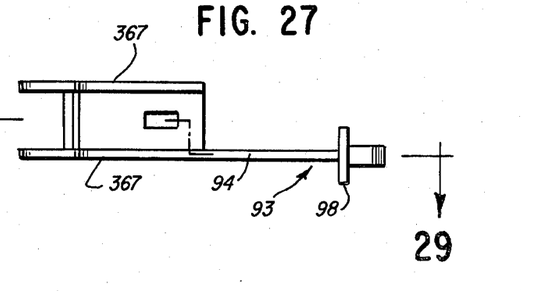
FIG. 27 is a bottom view of FIG. 29.
Figures 28, 29, 30:
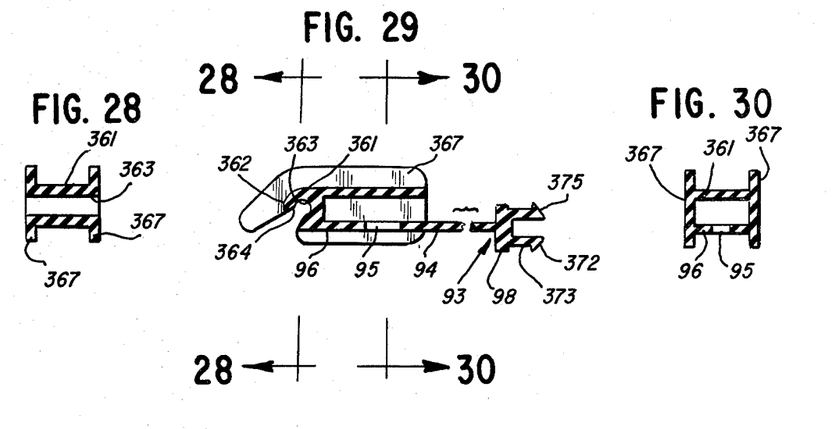
FIG. 28 is a cross-sectional view along line 28—28 of FIG. 29.
FIG. 29 is a cross-sectional view along line 29—29 of FIG. 27.
FIG. 30 is a cross-sectional view along line 30—30 of FIG. 29.

A first embodiment of the adaptor 60 of the invention is shown in FIGS. 5 to 11 and comprises an elongate body 61 having a front end portion 62 and a rear end portion 59. The body 61 is hollow over most of its length. The elongate body 61 has the general form of the internal surfaces 46,51 of the two arm ends 41,42 (FIGS. 10 and 11). The front end portion 62 of the adaptor 60 is provided with a first latch or blocking member comprising a socket 63 which has a constricted opening 64 through which the crosspin or rivet 44 of the wiper blade 43 snaps prior to seating in the socket 63.

A second latch or blocking member comprises a flexible member or blade 66 connected at one end portion to a crossbar 68 which, in turn, is connected to two side walls or flanks 67 extending transverse to the body 61 of the adaptor 60. At the free end portion of the flexible member 66 is formed a downwardly extending stop 70 having a tapered forward edge 71. The size and shape of the stop 70 corresponds to the size and shape of the rectangular opening 48 in the wiper arm end 41.

In order to mount the wiper arm end 41 on the adaptor 60, the rivet 44 is first aligned with the socket 63 with the adaptor 60 oriented at substantially a right angle to the blade 43 and extending into the rectangular opening 56 in the blade 43. The adaptor 60 is pushed toward the rivet 44 until the rivet snaps into the socket 63 in the adaptor. The adaptor 60 is retained at the substantially 90° position relative to the blade 43 as the hook 45 on the wiper arm end 41 is first threaded through the opening 56 between the top of the adaptor 60 and the edge of the opening. The body 61 of the adaptor 60 is pushed into the hook-shaped opening in the arm end 41. During this operation, the tapered surface 71 of the free end portion 49 of the hook 45 pushes the stop 70 upwards. Once the stop 70 is aligned with the rectangular opening 48 in the wiper arm end 41, said stop 70 snaps into the opening 48 and thus locks or latches the wiper arm end 41 with respect to the adaptor 60 (FIG. 10). For removing the wiper arm end 41 from the adaptor 60, it will be sufficient to slightly push upwards on the stop 70, for example with a screwdriver, whereupon the blade 43 is moved relative to the arm until the arm and blade are separated.

For connecting the second style wiper arm end 42 to the adaptor 60, two inwardly projecting stops 72 are provided on two flexible members or blades 73 integrally formed at one end portion to the side walls 67. The flexible members or blades 73 lie in the planes of said side walls 67 and are parallel to the bottom edges of said side walls 67. The stops 72 have tapered forward edges 75 and are of a size and shape to fit behind the shoulder 58 on the downturned end portion 54 of the hook 50.

The mounting of the wiper arm end 42 on the adaptor 60 is accomplished in exactly the same manner as for the wiper arm end 41. In the present case, after the adaptor 60 is connected to the rivet 44 and the arm end is threaded through the opening 56 in the blade 43, the extremity of the second curvature 55 of the wiper arm end 42 engages the two tapered edges 75 to push the two stops 72 away from the center of the adaptor 60, this being possible as long as the adaptor 60 is in a position which is substantially perpendicular to the wiper blade 43. When the stops 72 have snapped underneath the hook 50 and behind the shoulder 58 of the second curvature 55 of the wiper arm end 42, the adaptor 60 is brought from its substantially perpendicular position with respect to the wiper blade 43, to a position which is substantially parallel to said wiper blade 43 and which is the normal working position. At the normal working position, the stops 72 no longer can move outwardly because they are stopped by the two side walls 57 (FIG. 3) of the wiper blade 43 and the wiper arm end 42 is, therefore, completely blocked with respect to the adaptor 60 (FIG. 11). For removing the wiper arm end 42 from the adaptor 60, said arm end 42 and adaptor 60 are rotated to a substantially perpendicular position with respect to the wiper blade 43 and the two stops 72 are then pushed aside, for example with a finger, so that the arm end 42 can be disconnected from the adaptor 60.

A second embodiment of the adaptor 160 is shown in FIGS. 12 to 18. The basic principle, as well as the way to mount and remove the wiper arm ends 41,42, remains the same as in FIGS. 5 to 11. The difference is that in the present embodiment, the flexible member or blade 166 is located beneath the external surface 47,52 of the curved portions of the wiper arm ends 41,42. The stop 170 has a tapered forward edge 171 and enters from beneath into the rectangular opening 48 in the wiper arm end 41, instead of from above, as in the embodiment of FIGS. 5 to 11. This position of the flexible blade 166 has the advantage that the stop 170 may be released by hand by engaging an extension 174 angularly disposed on said stop 170.

The remaining elements of the adaptor 160 are substantially the same as for adaptor 60 and include an elongate body 161 having a front end portion 162 and a rear end portion 159 with a first latch or blocking means formed by a socket 163 and a constricted opening 164 into said socket 163. A second latch or blocking means includes a flexible member 166 connected to the adaptor 160 by a crossbar 168 extending between spaced side walls or flanks 167. A third latch or blocking means includes two stops 172 extending inward from a pair of flexible members or blades 173, which flexible members 173 are integrally formed at one end portion to the side walls 167. The stops 172 have tapered forward edges 175. The arm ends 41,42 are connected to and removed from the adaptor 160 as described with respect to FIGS. 5 to 11.

A third embodiment of the adaptor 260 is shown in FIGS. 19 to 25. Here again the way to mount and to remove the wiper arm ends 41,42 is accomplished in the same manner as in FIGS. 5 to 11. However, the rivet 44 of the wiper blade 43 is no longer introduced into its socket 63 from the front end portion 62 of the adaptor 60 of FIG. 5, but instead is introduced from the rear end portion 259. A first latch or blocking means in a front end portion 262 includes a socket 263 having a constricted opening 264 facing toward the rear end portion 259 for retaining the rivet 44 in the socket 263.

A supplementary retainer 282 may be provided on the adaptor 260 and includes an extension 283 of the flexible member or blade 266 of a second latch or blocking means. The extension 283 extends up to the constricted opening 264. When introducing the rivet 44 into the socket 263, the extension 283 of the flexible blade 266 moves downward into the opening 284 between the stops 272. In the same manner, when removing the rivet 44 from the socket 263, the extension 283 is pushed downwards, for example with a screwdriver passing through the openings 285 provided at the upper part of the side walls 267 of the body 261 of the adaptor 260. It is to be noted that when removing the wiper arm end 41 from the adaptor 260 by pushing the stop 270 upwards, the extension 283 of the flexible member or blade 266 also enters into said opening 285.

The remaining elements of the adaptor 260 are substantially the same as for adaptor 60 and include the second latch or blocking member having the flexible member or blade 266 connected by means of a crossbar 268 to two branches 269 of the side walls or flanks 267. The flexible member 266 has a stop 270 which has a tapered forward edge 271 for deflecting the stop 270 during assembly with arm end 41. The third latch or blocking means is comprised of two stops 272 extending inward from the pair of flexible members or blades 273, which flexible members 273 are integrally formed at one end portion to the side walls 267. The stops 272 have tapered forward edges 275. The arm ends 41,42 are connected to and removed from the adaptor 260 as described above.

In the three above-mentioned embodiments of the invention, the stops 70,170,270 and the corresponding flexible blades 66,166,266 have a width which is slightly less than the width of the slot 53 of the wiper arm end 42, so that when mounting this style arm end on the adaptor, said stops and flexible blades may enter into the slot 53, without hindering the mounting of arm end 42 which, as explained above, is kept in place by the stops 72,172,272.

A fourth embodiment of the invention is shown in FIGS. 26 to 32. In this embodiment, the adaptor 360 is mounted on the rivet 44 of the wiper blade 43 by seating the rivet 44 in a first latch or blocking means including a socket 363 having a constricted opening 364 in the front end portion 362 of the adaptor 360, the same as with the adaptors of FIGS. 5 to 11 and 12 to 18. At the rear end portion 359 of the body 361, one of the side walls or flanks 367 of the adaptor 360 has attached thereto, by means of a small cord or tether 94, latch or blocking means 93 which is combined second and third latch or blocking means, i.e. this single latch 93 serves to secure the adaptor to both types of wiper arm ends 41 and 42.

The second and third latch or blocking means 93 comprises a rectangular base 98, the width of which is substantially equal to the width of the wiper arm ends 41,42. The base 98 supports a pair of flexible members 373 which have outwardly facing stops 372 on the outer ends thereof. The stops 372 have tapered edges 375 which serve to deflect the stops and flexible members 373 as the latch 93 is forced first through the rectangular opening 48 in the wiper arm end 41 and then through an aligned opening 95 provided in the lower wall 96 of the body 361 of the adaptor 360. In attaching the second style arm end 42 to the adaptor 360, the stops 372 and flexible members 373 are forced through the slot 53 of the wiper arm end 42 and through the opening 95 in the body 361 of the adaptor 360 with the base 98 of the latch 93 seating behind the shoulder 58 of the second curvature 55 of the arm end.

The mounting of the wiper arm ends 41,42 on the adaptor 360 according to this fourth embodiment of the invention is accomplished in the following manner: after having mounted the adaptor 360 on the rivet 44 of the wiper blade 43, as in the preceeding first and second embodiments, either the hook 45 or 50 of the wiper arm ends 41 or 42, respectively, is pushed over the body 361 of the adaptor 360. The stops 372 of latch 93 are then introduced into the rectangular opening 48 of the wiper arm end 41, or respectively, into the slot 53 of the wiper arm end 42 and at the same time into the opening 95 provided in the lower part 96 of the body 361 of the adaptor 360.

Figure 31:
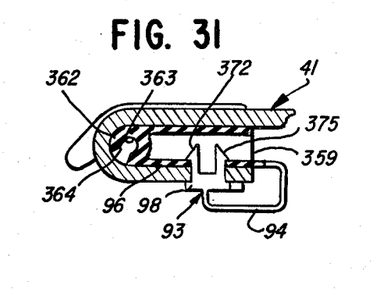
FIG. 31 is a cross-sectional view along line 29—29 of FIG. 27 with the first type of wiper arm end, such as shown in FIG. 1, mounted on the improved adaptor; and, FIG. 32 is a cross-sectional view along line 29—29 of FIG. 27 with the second type of wiper arm end, such as shown in FIG. 2, mounted on the improved adaptor.
Figure 32:
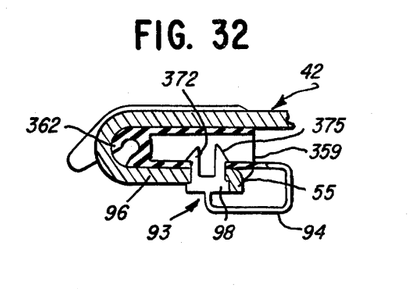

Since the body 361 of the adaptor 360 lies tightly inside the hooks 45, the wiper arm end 41 is completely blocked (FIG. 31). The same is true for the wiper arm end 42 because the base 98 of the latch 93 has a size and shape such that at least one of its transversal sides fits exactly against the shoulder 58 of the second curvature 55 of the wiper arm end 42 (FIG. 32).

INDUSTRIAL APPLICABILITY

An adaptor (60,160,260,360) is provided which has a first latch or blocking means (63,163,263,363) which secures the adaptor to a wiper blade. In the illustrated embodiment, the first latch or blocking means (63,163,263,363) is shown and described as a socket for seating over a crosspin (44), although it is to be understood that different first latch or blocking means could be provided for connecting the adaptor to a blade without departing from the invention. Four different second and third latch or blocking means (70,170,270,372 and 72,172,272,372) are provided on the adaptor (60,160,260,360) for engaging with an opening (48) in one style or type arm end (41) or in a slot (53) and behind a shoulder (58) in a second style or type arm end (42). Therefore, using one adaptor with two different styles or types of hook-shaped wiper arm ends can be selectively attached to a wiper blade.

Other aspects, objects and advantages of this invention can be obtained from a study of the drawings, the disclosure and the appended claims.

I claim:

1. An adaptor between a wiper blade (43) and two hook-shaped wiper arm ends (41,42), comprising an elongate body (61,161,261,361) which fits exactly into the inside of each of the two hooks (45,50) of said wiper arm ends (41,42) and is capable of being mounted on a rivet (44) of said wiper blade (43), characterized in that said adaptor also comprises:
   (a) first blocking means (63,163,263,363) located at the front end portion (62,162,262,362) of the adaptor (60,160,260,360) and permitting the snap-fitting of said device onto said rivet (44),
   (b) second blocking means (70,170,270,372) attached to the rear end portion (59,159,259,359) of the adaptor (60,160,260,360) and which cooperate with a first type of hook-shaped arm end (41) in order to prevent any displacement of said first-type arm end (41) with respect to said adaptor,
   (c) third blocking means (72,172,272,372) carried by the lower portion of the adaptor (60,160,260, 360) and which cooperate with a second type of hook-shaped arm end (42) in order to prevent any displacement of said second type arm end (42) with respect to said adaptor, wherein the elongate body (61,161,261) of the adaptor is hollow over most of its length, and comprises two lateral side walls (67,167,267) which project from said body (61,161,261) and wherein said second (70,170,270) and third (72,172,272) blocking means are attached to said lateral side walls (67,167,267).

2. An adaptor according to claim 1, wherein the second style wiper arm end (42) has a longitudinal slot (53) formed in the end portion (54) of the curved part of the hook, said end portion (54) has a second curvature (55) which directs said end portion (54) downwards to form a shoulder (58), characterized in that said third blocking means (72,172,272) comprise two stops (72,172,272) which place themselves behind the shoulder (58) of said second curvature (55) of the hook (50) and which stops are part of two flexible members or blades (73,173,273) carried by the two lateral side walls (67,167,267) of the adaptor.

3. An adaptor according to claim 2, characterized in that said two stops (72,172,272) each have an inclined surface (75,175,275) which facilitates the mounting of the hook (50) on the adaptor in permitting the spreading of the stops (72,172,272) and at the same time the passage of the curved part (55) of the hook (50).

4. An adaptor according to claim 1, wherein the wiper arm end is the first style arm end (41) having the end portion (49) of the hook (45) with a longitudinal rectangular opening (48) therein, characterized in that said second blocking means comprise one stop (70,170,270) which places itself into the rectangular opening (48) of the hook (45) and which is part of a longitudinal flexible member (66,166,266) linked to the two side walls (67,167,267) of the adaptor by means of a crossbar (68,168,268) located at the rear end portion (59,159,259) of said adaptor.

5. An adaptor according to claim 4, characterized in that the flexible member (66,166,266) and the corresponding stop (70,170,270) have a width slightly less than the width of the rectangular opening (48) of the hook (45).

6. An adpator according to claim 4, characterized in that the stop (70,170,270) comprises an inclined surface (71,171,271) which facilitates the mounting of the hook (45) on the adaptor in permitting the up or down movement of said stop (70,170,270) and at the same time the passage of the curved part of the hook (45).

7. An adaptor according to claim 4, characterized in that the flexible member (66,266) is located in the interior side (46) of the hook (45) and that the corresponding stop (70,270) enters from above into the rectangular opening (48) of the hook (45).

8. An adaptor according to claim 4, characterized in that the flexible member (166) is located at the exterior side (47) of the curved part of the hook (45) and that the corresponding stop (170) enters from beneath into the rectangular opening (48) of the hook (45).

9. A connecting device according to claim 8, characterized in that the free end portion of the flexible member (166) is provided with an extension (174) directed towards the front end portion (162) and towards the lower part of the device, thus making possible the manual actuating of said flexible member (166).

10. An adaptor according to claim 1, wherein the rivet (44) of the wiper blade (43) is introduced into its seat (263) through the rear end portion (259) of the adaptor, characterized in that the seat (263) for said rivet (44) faces towards the rear of the adaptor, with said first blocking means (263) having two resilient transversal protuberances (264) permitting the snap-fitting onto said rivet (44).

11. An adaptor according to claim 10, wherein a flexible member (266) is linked to the two side walls (267) at the rear of the adaptor, said rivet (44) of the wiper blade (43) being introduced into its seat (263) through the rear end portion (259) of the adaptor, characterized in that a free end portion of the flexible member (266) has an extension (283) which extends up to the first blocking means (263), the elongate body (261) of the adaptor (260) has an opening (285) above the extension (283) and has an opening (284) below the extension (283) to permit the passage of said extension (283) during attachment of said first-type wiper arm end (41) to the adaptor and during attachment of said adaptor to the rivet (44).

12. An adaptor according to claim 4, characterized in that the width of the flexible member (66,166,266) and of the corresponding stop (70,170,270) is slightly less than the width of a longitudinal slot (53) formed in the wiper arm end of the second type (42), wherein said stop (70,170,270) places itself into the longitudinal slot (53) in a manner corresponding to that for said first style arm.

13. An adaptor between a wiper blade (43) and two hook-shaped wiper arm ends (41,42), comprising an elongate body (361) which fits exactly into the inside of each of the two hooks (45,50) of said wiper arm ends (41,42) and is capable of being mounted on a rivet (44) of said wiper blade (43), characterized in that said adaptor also comprises:
    (a) first blocking means (363) located at the front end portion (362) of the adaptor (360) and permitting the snap-fitting of said device onto said rivet (44),
    (b) second and third blocking means (372), comrising a sole latch (93) attached to the rear end portion (359) of the adaptor (360) by a cord (94) and cooperating with the two types of wiper arm ends (41,42), said sole latch (93) comprising resilient means (373) and stops (372) capable of snapping into a slot (53) in the second type wiper arm end (42) and into a corresponding aligned opening (95) provided in a body (361) of the adaptor (360), said latch (93) having a base (98) which seats behind downturned end portion (54) of said second type arm end (42) to prevent displacement of the second type arm end with respect to said adaptor.

14. An adaptor between a wiper blade (43) and two hook-shaped wiper arm ends (41,42), comprising an elongate body (361) which fits exactly into the inside of each of the two hooks (45,50) of said wiper arm ends (41,42) and is capable of being mounted on a rivet (44) of said wiper blade (43), characterized in that said adaptor also comprises:
    (a) first blocking means (363) located at the front end portion (362) of the adaptor (360) and permitting the snap-fitting of said device onto said rivet (44),
    (b) second and third blocking means (372), comprising a sole latch (93) attached to the rear end portion (359) of the adaptor (360) by a cord (94) and cooperating with the two types of wiper arm ends (41,42), said sole latch (93) comprising resilient means (373) and stops (372) capable of snapping into a rectangular opening (48) in the wiper arm end of the first type (41) and into a corresponding and aligned opening (95) provided in a body (361) of the adaptor (360), thus preventing any displacement of the first-type wiper arm end (41) with respect to said adaptor.

15. An adaptor according to claim 14, characterized in that said resilient means (373) has two stops (372) resting on the interior surface of a lower wall (96) of the body (361) of the adaptor (360) and an enlarged rectangular base (98) resting against the external surface (47) of the hook (45) of the first type wiper arm (41).

16. An adaptor according to claim 14, characterized in that said same resilient means (373) of a sole latch (93) is also capable in snapping into the longitudinal slot (53) of the curved part of the wiper arm of the second type (42) and that at least one of the sides of a rectangular base (98) supporting said resilient means (373) rests against the shoulder (58) of the second curvature (55) of the hook (50) of said wiper arm (42), thus preventing displacement of this arm (42) with respect to said adaptor.

17. An adapter according to claim 1, wherein flexible means (73,173,273) carrying said third blocking means (72,172,272) engage with the walls (57) of the blade (43) when the adaptor is in operative position on the second type arm end (42) to prevent disengagement of the arm end (42) from the blade (43).

* * * * *

UNITED STATES PATENT AND TRADEMARK OFFICE
CERTIFICATE OF CORRECTION

PATENT NO. : 4,290,164

DATED : September 22, 1981

INVENTOR(S) : Johan H. van den Berg

It is certified that error appears in the above-identified patent and that said Letters Patent is hereby corrected as shown below:

On the title page, Item [73] Should read:

--- [73] Assignee: Champion Spark Plug Europe S.A. ---.

Signed and Sealed this

Twenty-fourth Day of May 1983

[SEAL]

Attest:

DONALD J. QUIGG

*Attesting Officer*     *Acting Commissioner of Patents and Trademarks*

UNITED STATES PATENT AND TRADEMARK OFFICE
CERTIFICATE OF CORRECTION

PATENT NO. : 4,290,164

DATED : September 22, 1981

INVENTOR(S) : Johan H. van den Berg

It is certified that error appears in the above—identified patent and that said Letters Patent is hereby corrected as shown below:

On the title page, Item [73] Assignee: should read

-- [73] Assignee: Champion Spark Plug Europe S.A., Binche Belgium --.

Signed and Sealed this

Thirteenth Day of September 1983

[SEAL]

Attest:

Attesting Officer

GERALD J. MOSSINGHOFF

Commissioner of Patents and Trademarks